(12) United States Patent
Yamamoto et al.

(10) Patent No.: US 7,582,996 B2
(45) Date of Patent: Sep. 1, 2009

(54) DYNAMIC PRESSURE BEARING MOTOR

(75) Inventors: Takeyoshi Yamamoto, Ozu (JP);
Yasunori Tokuno, Ozu (JP); Masahiro Jyono, Ozu (JP); Taizo Ikegawa, Ozu (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 10/544,782

(22) PCT Filed: Feb. 24, 2004

(86) PCT No.: PCT/JP2004/002155

§ 371 (c)(1),
(2), (4) Date: Aug. 8, 2005

(87) PCT Pub. No.: WO2004/079215

PCT Pub. Date: Sep. 16, 2004

(65) Prior Publication Data
US 2006/0138887 A1  Jun. 29, 2006

(30) Foreign Application Priority Data
Feb. 26, 2003  (JP)  ............................. 2003-048380

(51) Int. Cl.
*H02K 5/16* (2006.01)
*H02K 7/08* (2006.01)
*F16C 17/10* (2006.01)
*F16C 17/22* (2006.01)
*F16C 33/24* (2006.01)

(52) U.S. Cl. ..................... 310/90; 310/67 R; 384/107; 384/446; 360/98.07

(58) Field of Classification Search .............. 310/67 R, 310/90; 384/107, 446; 360/98.07
See application file for complete search history.

(56) References Cited

U.S. PATENT DOCUMENTS 5,366,298 A * 11/1994 Toshimitsu et al. ......... 384/107
5,973,878 A * 10/1999 Yoshida et al. ........... 360/98.07
6,341,896 B1 * 1/2002 Miura et al. ................ 384/115

FOREIGN PATENT DOCUMENTS

JP  6-307437  11/1994

(Continued)

OTHER PUBLICATIONS

Translation of JP 2003018787 A, Jan. 2003, Wakitani, "Brushless Motor".*

*Primary Examiner*—Quyen Leung
*Assistant Examiner*—David W. Scheuermann
(74) *Attorney, Agent, or Firm*—Steptoe & Johnson LLP

(57) ABSTRACT

A magnet (13) for trapping abraded powder is disposed in a connecting passage between an opening of a sleeve and an opening of a hydrodynamic bearing motor, and a shaft (3), a sleeve (4), a thrust flange (7), and a thrust main plate (5) are made of an austenitic stainless. With this configuration, since the austenitic stainless acting as a nonmagnetic substance is used, it is possible to increase a degree of cleaning. Further, abraded powder of the austenitic stainless is transformed into a magnetic substance, and thus a flow of the abraded powder to the outside can be prevented by providing the magnet for trapping abraded powder in the connecting passage between an opening of a bearing and the outside of the motor.

31 Claims, 10 Drawing Sheets

FOREIGN PATENT DOCUMENTS

| | | |
|---|---|---|
| JP | 7-274427 | 10/1995 |
| JP | 9-222120 | 8/1997 |
| JP | 11-275807 | 10/1999 |
| JP | 2000-352417 | 12/2000 |
| JP | 2001-146915 | 5/2001 |
| JP | 2002-61642 | 2/2002 |
| JP | 2003018787 A * | 1/2003 |

* cited by examiner

F I G. 2
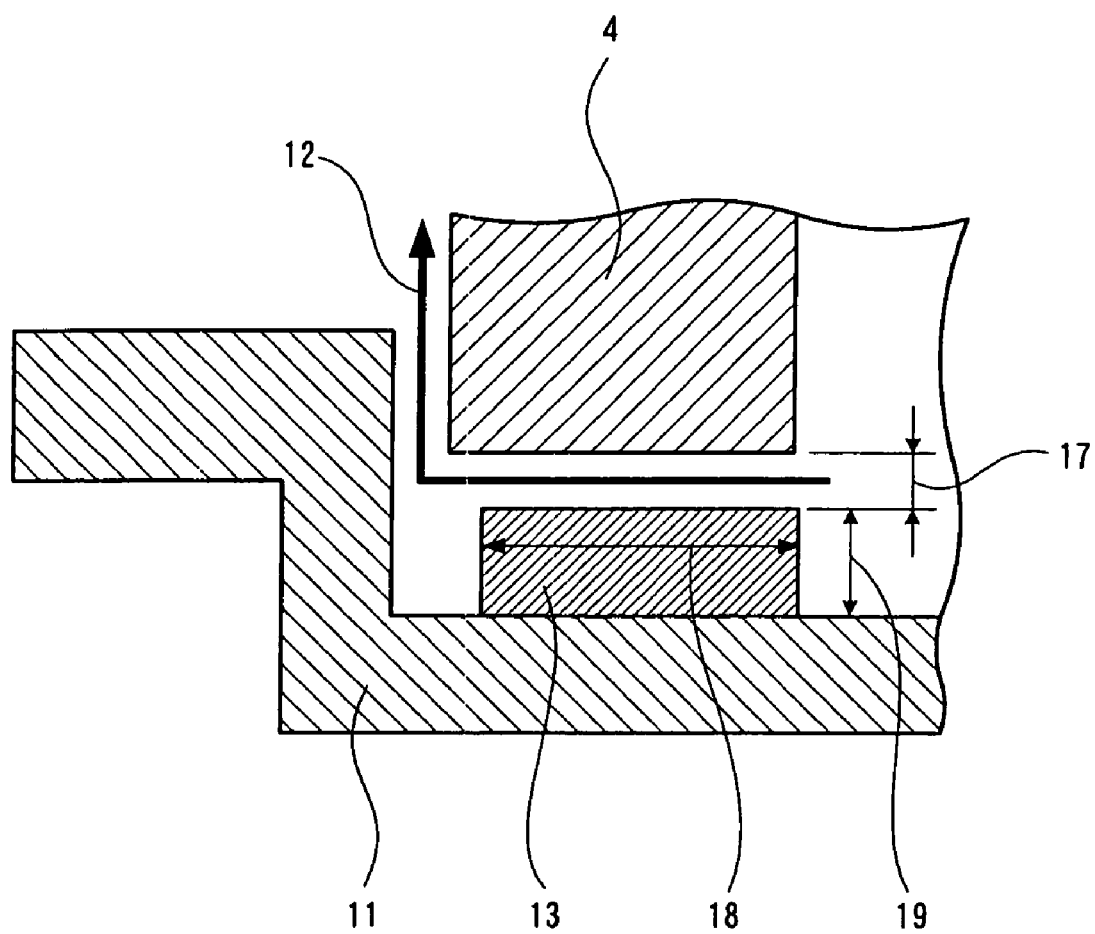

DYNAMIC PRESSURE BEARING MOTOR

The present application is based on International Application PCT/JP2004/002155, filed Feb. 24, 2004, which application is incorporated herein by reference in its entirety.

TECHNICAL FIELD

The present invention relates to a hydrodynamic bearing motor mounted in a disc drive device, a laser beam printer and so on which are mainly used in the field of information processing.

BACKGROUND ART

Conventionally, ball bearings are used as the bearings of motors for disc drive devices and laser beam printers. In recent years, along with faster rotations of motors in response to demands for faster data transfer and faster printing, hydrodynamic bearings disclosed in, e.g., Japanese Patent Laid-Open No. 2000-352417 and Japanese Patent Laid-Open No. 11-275807 have been used as bearings, instead of conventional ball bearings, to respond to fast rotations of motors.

FIG. 9 shows a conventional hydrodynamic bearing motor disclosed in Japanese Patent Laid-Open No. 2000-352417.

A thrust flange 107 and a shaft 103 are both made of a magnetic material such as iron. A hydrodynamic thrust bearing is constituted of a clearance 102 in which the shaft 103 and the thrust flange 107 disposed on the upper end of a thrust shaft 108 are opposed to each other. A clearance 101 between a sleeve 104 and the shaft 103 forms a hydrodynamic radial bearing. Reference numeral 106 denotes a cylindrical sealing magnet and reference numeral 113 denotes a trapping magnet.

A magnet 109 for the rotor of a driving motor M is provided in the sleeve 104. A stator 110 of the driving motor M is provided on a base 111 so as to face the magnet 109. When the stator 110 is energized to rotate the driving motor M at a predetermined rotational speed, the sleeve 104 keeps the clearances 101 and 102 between the shaft 103 and the sleeve 104 and rotates in a noncontact manner.

FIG. 10 shows the conventional hydrodynamic bearing motor disclosed in Japanese Patent Laid-Open No. 11-275807.

In FIG. 10, a hydrodynamic thrust bearing is formed by a clearance 122A in which a thrust main plate 125 and a thrust flange 127 attached to the lower end of a pin 128 of a sleeve 124 face each other, and a clearance 122B in which the thrust flange 127 and a thrust sub plate 126 face each other.

Further, a clearance 121 between the sleeve 124 and a shaft 123 forms a hydrodynamic radial bearing.

A magnet 129 for the rotor of a driving motor M is provided on the outer periphery of the pin 128. A stator 130 of the driving motor M is provided on the inner periphery of the cylindrical shaft 123 so as to face the magnet 129. When the stator 130 is energized to rotate the sleeve 124 at a predetermined rotational speed, the sleeve 124 keeps the clearances 121, 122A and 122B between the shaft 123 and the sleeve 124 and rotates in a noncontact manner.

In general, the hydrodynamic bearing motor rotates in a noncontact manner and thus causes few vibrations and little noise with fast rotations. However, in FIG. 9, abraded powder is caused by a contact between the facing surfaces of the clearance 101 and 102.

In the hydrodynamic bearing, facing surfaces are not in contact with each other due to the occurrence of a hydrodynamic pressure when a rotation is made at a predetermined rotational speed (during a steady-state rotation). However, during start time from when a stop is made to when the predetermined rotational speed is obtained and during stop time from when the predetermined rotational speed is obtained to when a stop is made, the facing surfaces are brought into contact with each other due to an insufficient hydrodynamic pressure.

That is, the shaft 103 and the sleeve 104 make contact with each other and rub together at the start and stop of rotation, and the surfaces are abraded and produce abraded powder. Further, the shaft 103 and the thrust flange 107 make contact with each other and produce abraded powder. When disturbance is applied, contact may be made between the shaft 103 and the sleeve 104 and between the shaft 103 and the thrust flange 107 and produce abraded powder even in a steady-state rotation.

In the case where the abraded powder flows with an air current, which is generated by the rotation of the hydrodynamic bearing motor, from an external opening 116 of the hydrodynamic bearing motor to the outside through a path indicated by an arrow 112 (hereinafter, referred to as a connecting passage 112), when the hydrodynamic bearing motor is used for a hard disc drive device, ahead and a disc attached to the hydrodynamic bearing motor may be damaged.

When the hydrodynamic bearing motor is used for driving a polygon mirror in a printer, the abraded powder contaminates the polygon mirror and thus adversely affects the quality of printing.

In order to solve the problem, in FIG. 9, the trapping magnet 113 shaped like a ring is disposed in the connecting passage 112 for connecting an open end 115 of a radial bearing and an external opening 116 of the hydrodynamic bearing motor. To be specific, a clearance 117 between the facing surfaces of the magnet 113 and the sleeve 104 is reduced and the abraded powder of a magnetic substance passing through the clearance is stuck to the magnet 113.

In FIG. 10, a ring-shaped labyrinth seal 140 is disposed in a connecting passage indicated by an arrow 132.

Further, a method of trapping abraded powder with a filter (not shown) and a method of trapping abraded powder by forming an adhesive layer in a connecting passage (not shown) are proposed. For example, refer to Japanese Patent Laid-Open No. 2001-146915 (filter 30 shown in FIG. 1) and Japanese Patent Laid-Open No. 8-205467 (adhesive layer 40 shown in FIG. 2).

Bearing members are made of a magnetic material to stick abraded powder on the magnet 113. However, devices using such hydrodynamic bearing motors have improved in performance in recent years, and thus demands on contamination of motors are intensified and a higher degree of cleaning is desired. Since magnetic particles (e.g., magnetic powder) are stuck to magnet materials, magnetic materials are hard to improve in a degree of cleaning and have become unusable for bearing members.

On the other hand, in FIG. 10, bearing members can be made of a nonmagnetic material and thus can improve a degree of cleaning parts. Since the labyrinth seal 140 is provided, the flow of abraded powder can be prevented by performing the shielding function of the labyrinth seal 140 through an air flow when the hydrodynamic bearing motor is rotated. However, the function is lost during stop and abraded powder flows to the outside of the hydrodynamic bearing motor.

Moreover, the trapping method using a filter cannot be put into practical use for the following reasons: abraded powder is micrometer-sized and cannot be trapped by ordinary filters, and in order to use filters capable of trapping, it is necessary to pass air with an extremely high pressure.

Further, regarding the trapping method of forming an adhesive layer in a connecting passage, abraded powder cannot be trapped when no contact is made to the adhesive layer, so that it is not possible to completely prevent the flow of abraded powder.

The present invention is devised to solve the conventional problems and has as its object the provision of a hydrodynamic bearing motor and a device using the same whereby a degree of cleaning bearing members is increased and high reliability is achieved without allowing abraded powder to flow to the outside of the motor, the abraded powder being produced at the start and stop of the motor and at the occurrence of disturbance during rotation.

DISCLOSURE OF THE INVENTION

The hydrodynamic bearing motor of the present invention has a shaft which is supported by a hydrodynamic radial bearing and a hydrodynamic thrust bearing so as to rotate in a relative manner, a sleeve, and a driving motor, wherein a magnet for trapping abraded powder is disposed in a connecting passage between an opening of the sleeve and an opening of the hydrodynamic bearing motor, and members forming the hydrodynamic radial bearing and the hydrodynamic thrust bearing are made of an austenitic stainless.

Further, the hydrodynamic bearing motor of the present invention has a shaft which is supported by a hydrodynamic radial bearing and a hydrodynamic thrust bearing so as to rotate in a relative manner, a sleeve, and a driving motor, wherein a magnet for trapping abraded powder is disposed in a connecting passage between an opening of the sleeve and an opening of the hydrodynamic bearing motor, one of members forming the hydrodynamic radial bearing and the hydrodynamic thrust bearing is made of an austenitic stainless and the other member is made of a material harder than the austenitic stainless.

According to this configuration, since the austenitic stainless acting as a nonmagnetic substance is used, it is possible to increase a degree of cleaning the bearing members. Moreover, since abraded powder of an austenitic stainless is transformed into a magnetic substance, a flow of abraded powder to the outside can be prevented by providing a magnet for trapping abraded powder in the connecting passage between the open end of the bearing and the outside of the motor. With this action, it is possible to provide a hydrodynamic bearing motor which can respond to demands on contamination, cause no flow of abraded powder to the outside of the motor, cause no degradation or the like of motor characteristics, and secure high reliability.

Further, when the members forming the hydrodynamic radial bearing and the hydrodynamic thrust bearing are made of an austenitic stainless, the magnet for trapping abraded powder has a length of 0.5 mm or longer along the connecting passage, the connecting passage has a width of 2.0 mm or less, and the magnet for trapping abraded powder has a surface magnetic flux density of 0.01 T or higher, so that the hydrodynamic radial bearing and the hydrodynamic thrust bearing which make contact with each other during stop have a bearing stress of 300 Pa or higher. Hence, it is possible to transform abraded powder, which is produced by the hydrodynamic radial bearing and the hydrodynamic thrust bearing, into a magnetic substance, and the abraded powder can be stuck to the magnet for trapping abraded powder.

Further, when one of the members forming the hydrodynamic radial bearing and the hydrodynamic thrust bearing is made of an austenitic stainless and the other is made of a material harder than the austenitic stainless, the magnet for trapping abraded powder has a length of 0.5 mm or longer along the connecting passage, the connecting passage has a width of 10 mm or less, and the magnet for trapping abraded powder has a surface magnetic flux density of 0.01 T or higher, so that the hydrodynamic radial bearing and the hydrodynamic thrust bearing which make contact with each other during stop have a bearing stress of 300 Pa or higher. Hence, it is possible to transform abraded powder, which is produced by the hydrodynamic radial bearing and the hydrodynamic thrust bearing, into a magnetic substance, and the abraded powder can be stuck to the magnet for trapping abraded powder.

BRIEF DESCRIPTION OF THE DRAWINGS

FIG. 2 is an enlarged sectional view showing a connecting passage on the left end according to the embodiment;

BEST MODE FOR CARRYING OUT THE INVENTION

Referring to FIGS. 1 to 8, the following will describe embodiments of the present invention.

Embodiment 1

Figure 1:
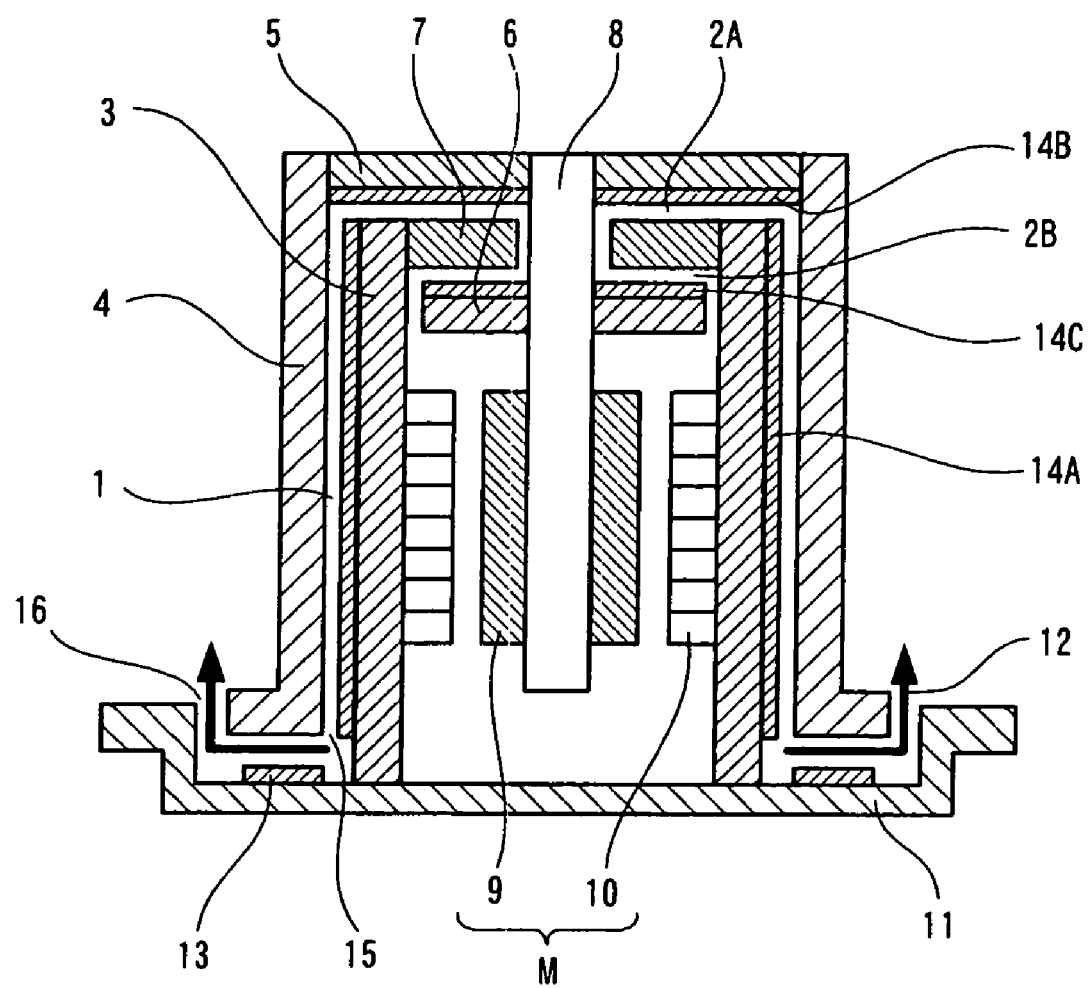
FIG. 1 is a sectional view showing a hydrodynamic bearing motor according to (Embodiment 1) of the present invention.
Figure 3:
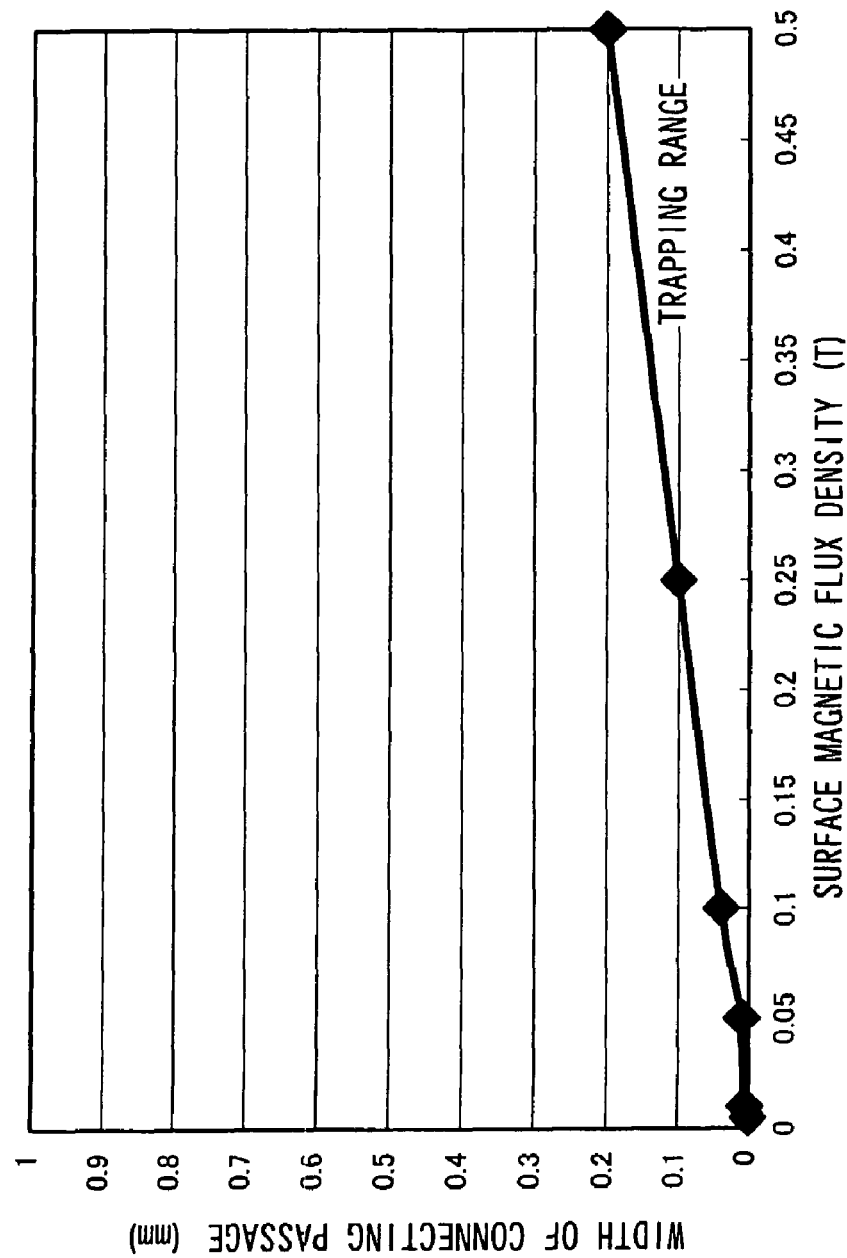
FIG. 3 is a graph showing experiment results on conditions of trapping abraded powder according to the embodiment.

FIGS. 1 to 3 show Embodiment 1 of the present invention.

FIGS. 1 and 2 are sectional views showing a hydrodynamic bearing motor.

FIG. 1 shows an example where the hydrodynamic bearing motor is applied to a hard disc drive motor. A cylindrical shaft 3 is attached to a base 11 serving as the base of the hydrodynamic bearing motor, and a thrust flange 7 is attached to the upper end of the shaft 3. A stator 10 of a driving motor M is attached to the inner wall of the hollow part of the shaft 3. A sleeve 4 is rotationally attached to the outside of the shaft 3 and a thrust main plate 5 is attached to the upper end of the sleeve 4.

The sleeve 4 has a pin 8 acting as the axis of rotation and a thrust sub plate 6 is attached to the pin 8 so as to face the thrust flange 7. A ring-shaped magnet 9, which faces a stator 10 and acts as the rotor of the driving motor M, is attached to the outer periphery of the pin 8. The magnet 9 applies a torque to the sleeve 4 by means of a magnetic force applied between the magnet 9 and the stator 10.

A hydrodynamic radial bearing is formed in a clearance 1 (e.g., 1 to 10 μm, preferably 1 to 5 μm) between the shaft 3 and the sleeve 4, and a hydrodynamic thrust bearing is formed in a clearance 2A (e.g., 1 to 20 μm, preferably 1 to 10 μm) between the thrust flange 7 and the thrust main plate 5 and a clearance 2B (e.g., 1 to 20 μm, preferably 1 to 10 μm) between the thrust flange 7 and the thrust sub plate 6.

A hydrodynamic pressure generating groove like a herringbone and a spiral is generally formed on at least one of the outer periphery of the shaft 3 and the inner surface of the sleeve 4. This groove is not shown because it has been already known in this technical field. Further, a hydrodynamic pressure generating groove like a herringbone and a spiral is formed on all the surfaces of the thrust main plate 5, the thrust sub plate 6, and the thrust flange 7.

In the hydrodynamic bearing motor configured thus, a hydrodynamic pressure is generated in the clearances 1, 2A, and 2B during a steady-state rotation of the sleeve 4 and the sleeve 4 is supported by the shaft 3 in a noncontact manner. However, since a sufficient hydrodynamic pressure is not generated at the start and stop of the hydrodynamic bearing motor, a contact is made between the sleeve 4 and the shaft 3 and between the main plate 5 and the thrust flange 7, wear occurs due to friction, and abraded power appears. Further, when a large force is applied by disturbance during rotation, the above contact may occur and cause abraded powder.

Since devices using the hydrodynamic bearing motor have improved in performance in recent years, demands on contamination of motors are intensified and a higher degree of cleaning is desired. Magnetic materials are hard to improve in the degree of cleaning and thus have become unusable for bearing members.

In (Embodiment 1), the configuration discussed below prevents abraded powder from flowing to the outside of the hydrodynamic bearing motor, without using magnetic materials.

A ring-shaped magnet 13 for trapping abraded powder is disposed in a connecting passage 12 provided between an opening 15 of the sleeve 4 and an external opening 16 of the hydrodynamic bearing motor. The sleeve 4, the shaft 3, the thrust flange 7, the thrust main plate 5, and the thrust sub plate 6 are made of an austenitic stainless (e.g., Japanese Industrial Standards, JIS SUS 303 and SUS 304).

Although the austenitic stainless is a nonmagnetic substance, a hydrodynamic bearing is formed by setting the weights of the sleeve 4, the thrust main plate 5, the thrust sub plate 6, the pin 8, and the magnet 9 on the rotation side in such a way that a bearing surface making a contact during stop has a bearing stress of at least 300 Pa, so that distortion-induced transformation is caused by the application of a stress and abraded powder is transformed into magnetic substances by transforming an austenitic structure into martensite.

Therefore, the produced abraded powder is stuck to the magnet 13 for trapping abraded powder, thereby preventing the abraded powder from flowing to the outside. Further, since the austenitic stainless is a nonmagnetic substance, it is possible to increase a degree of cleaning a bearing member. A desirable bearing stress is 1000 Pa or higher on the bearing surface making a contact during stop. 3000 Pa or higher is more desirable. The position of the magnetic 13 for trapping abraded powder is not limited to that of FIG. 1. The magnet 13 may be disposed anywhere in the connecting passage 12 of an air current (indicated by an arrow) generated by the rotation of the hydrodynamic bearing motor.

Further, the hydrodynamic bearing motor shown in FIG. 1 is an inner motor where the stator 10 and the magnet 9 are disposed inside the shaft 3. The present embodiment is also applicable to facing motors (not shown) and an outer motor where a stator and a magnet are disposed outside a hydrodynamic radial bearing.

Moreover, coating layers 14A, 14B, and 14C are formed on the outer periphery of the shaft 3 and the surfaces of the thrust main plate 5 and the thrust sub plate 6. Ceramics such as TiN, TiAlN, TiC, TiCN, CrN, SiC, $Si_3N_4$, $Al_2O_3$, and cBN (Cubic Boron Nitride) are suitable for the coating layers. With this configuration, since ceramics have a high hardness, the bearing surface increases in wear resistance.

When DLC (Diamond Like Carbon) of an amorphous carbon, a hydrogenated amorphous carbon, a diamond like carbon film, a hard carbon film and so on is used for the coating layers 14A, 14B, and 14C, wear resistance improves and a friction coefficient decreases.

By forming lubricating films of graphite, $MoS_2$, PTFE, and so on as the coating layers 14A, 14B, and 14C, a friction coefficient can be further reduced.

The coating layer 14A may be formed on the inner periphery of the sleeve 4 and the coating layers 14B and 14C may be formed on the upper and lower surfaces of the thrust flange 7. Further, the coating layer 14A may be formed on the inner periphery of the sleeve 4 and the outer periphery of the shaft 3, and the coating layers 14B and 14C may be formed on the surfaces of the thrust main plate 5 and the thrust sub plate 6 and both surfaces of the thrust flange 7.

FIG. 2 is a partially enlarged sectional view showing the lower left part of FIG. 1.

In FIG. 2, a width 18 of the magnet 13 for trapping abraded powder, a width 17 of the connecting passage 12, and a surface magnetic flux density of the magnet 13 for trapping abraded powder are set in such a way that abraded powder passing through the connecting passage 12 is stuck to the magnet 13 for trapping abraded powder. Reference numeral 19 denotes a height of the magnet for trapping abraded powder. To be specific, the following settings are made.

FIG. 3 is a graph showing trapping conditions for preventing a flow of abraded powder when the width 17 of the connecting passage and the surface magnetic flux density of the magnet 13 for trapping abraded powder are changed. The width 18 of the magnet 13 for trapping abraded powder is 2.0 mm. The flow can be prevented within a range under the line of the graph.

As a result of such experiments conducted while changing the width 18 of the magnetic 13 for trapping abraded powder, it was found that abraded powder passing through the connecting passage 12 can be stuck to the magnet 13 for trapping abraded powder when the width 18 of the magnetic 13 for trapping abraded powder is at 0.5 mm or larger, the width 17 of the connecting passage is set at 2.0 mm or less, and the surface magnetic flux density of the magnet 13 for trapping abraded powder is set at 0.01 T or higher. By setting these conditions, it is possible to prevent abraded powder from flowing to the outside of the motor.

The hydrodynamic bearing motor of (Embodiment 1) shown in FIG. 1 has an overhung hydrodynamic bearing structure with a fixed shaft. In this structure, the thrust main plate 5, the thrust sub plate 6, and the thrust flange 7 serving as a hydrodynamic thrust bearing are provided on the upper part of the inside of the hydrodynamic radial bearing constituted of the sleeve 4 and the shaft 3. However, the present invention is not limited to the hydrodynamic bearing structure of FIG. 1 and is applicable to hydrodynamic bearing motors having hydrodynamic bearings of other configurations.

Figure 9:
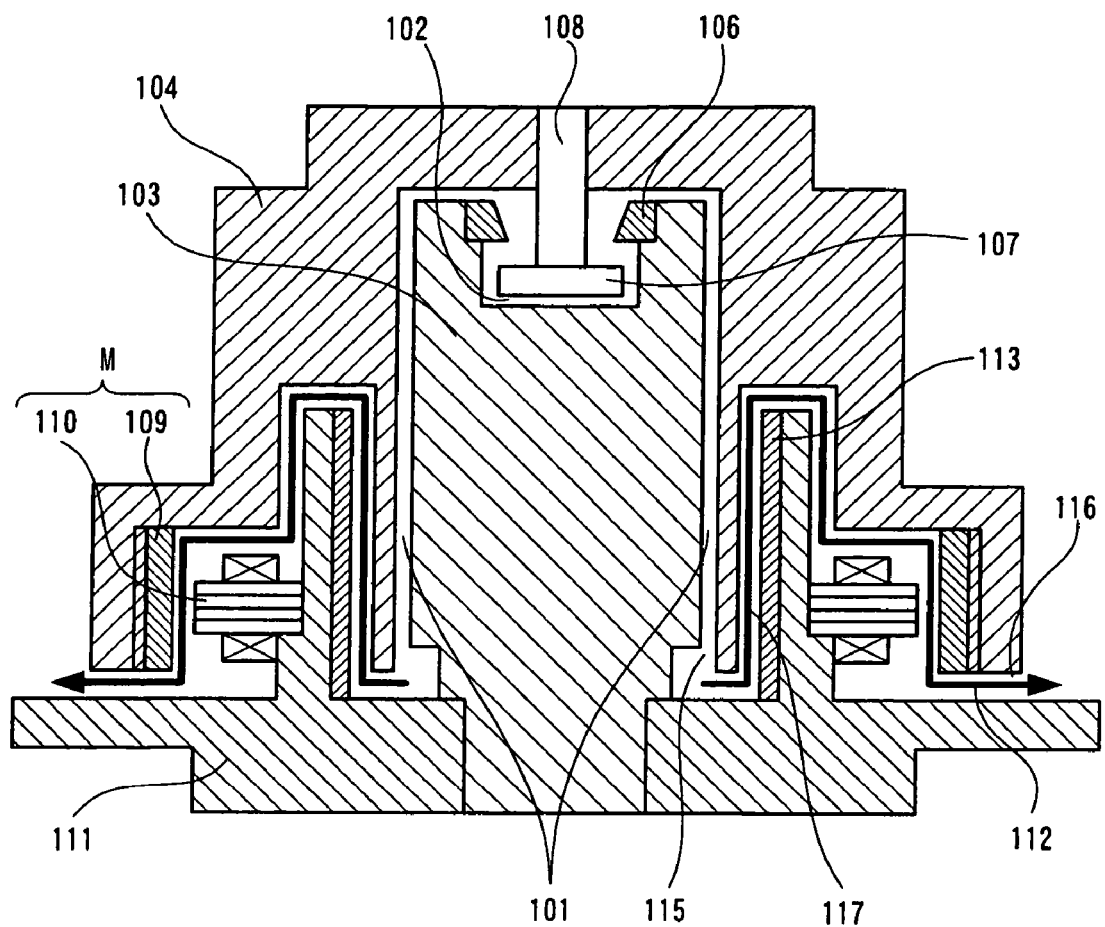
FIG. 9 is a sectional view showing a conventional hydrodynamic bearing motor.
Figure 10:
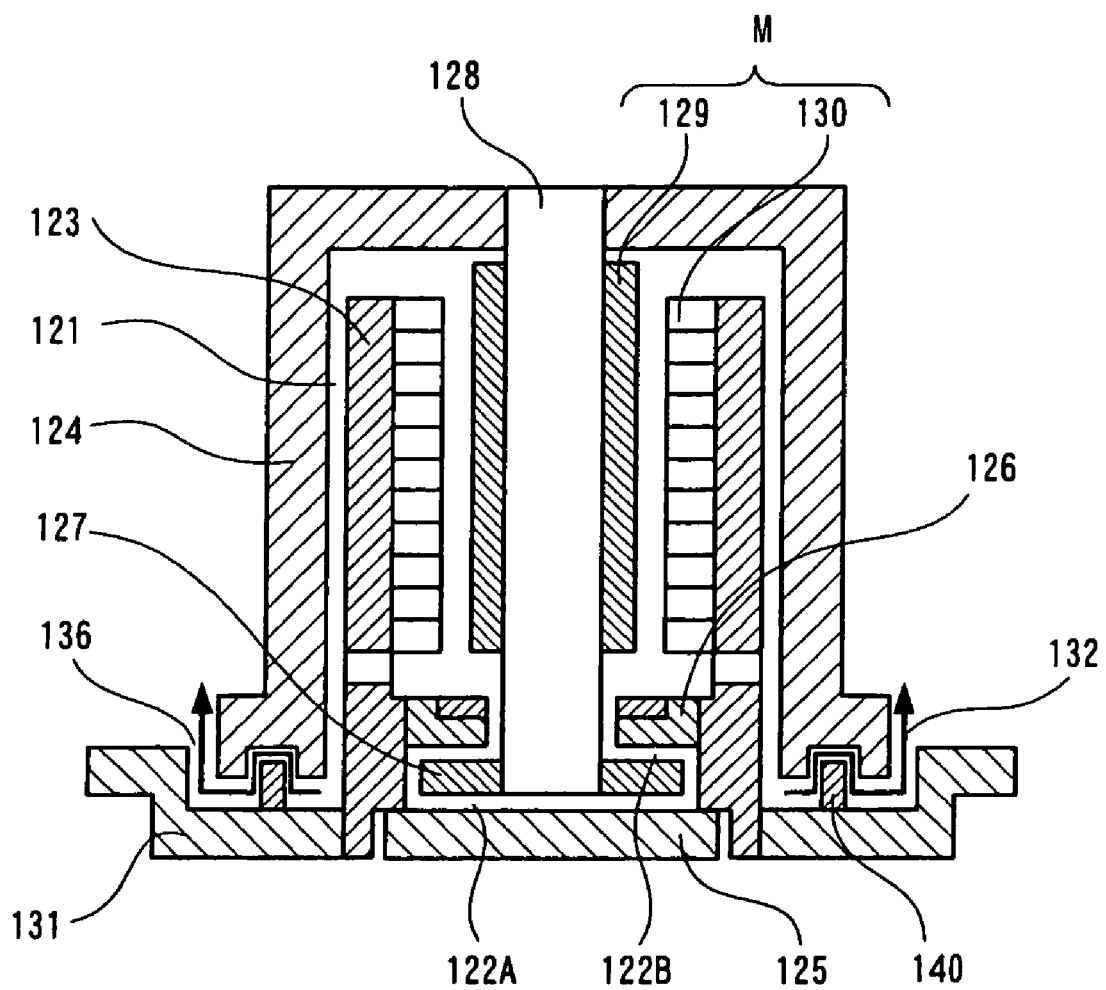
FIG. 10 is a sectional view showing a hydrodynamic bearing motor of another conventional example.

For example, the present invention is applicable to a hydrodynamic bearing motor in which a shaft is supported on both sides (not shown) instead of the overhung structure. In this case, magnets for trapping abraded powder are provided on both ends of the shaft. Moreover, the present invention is also applicable to the configurations of FIGS. 9 and 10 having been discussed in Background Art, a hydrodynamic bearing motor in which the shapes and positions of a hydrodynamic radial bearing and a hydrodynamic thrust bearing are changed and a shaft 3 is rotated, a spherical hydrodynamic bearing motor in which a hydrodynamic radial bearing and a hydrodynamic thrust bearing are integrated, and a hydrodynamic bearing motor shaped like an abacus (not shown).

The hydrodynamic bearing motor of (Embodiment 1) can solve problems arising in a device to which a rotor such as a polygon mirror and a recording disc are attached and rotate at high speed, and the hydrodynamic bearing motor is the most suitable as a rotational driving source of a recorder and a printer.

EMBODIMENT 2

Figure 4:
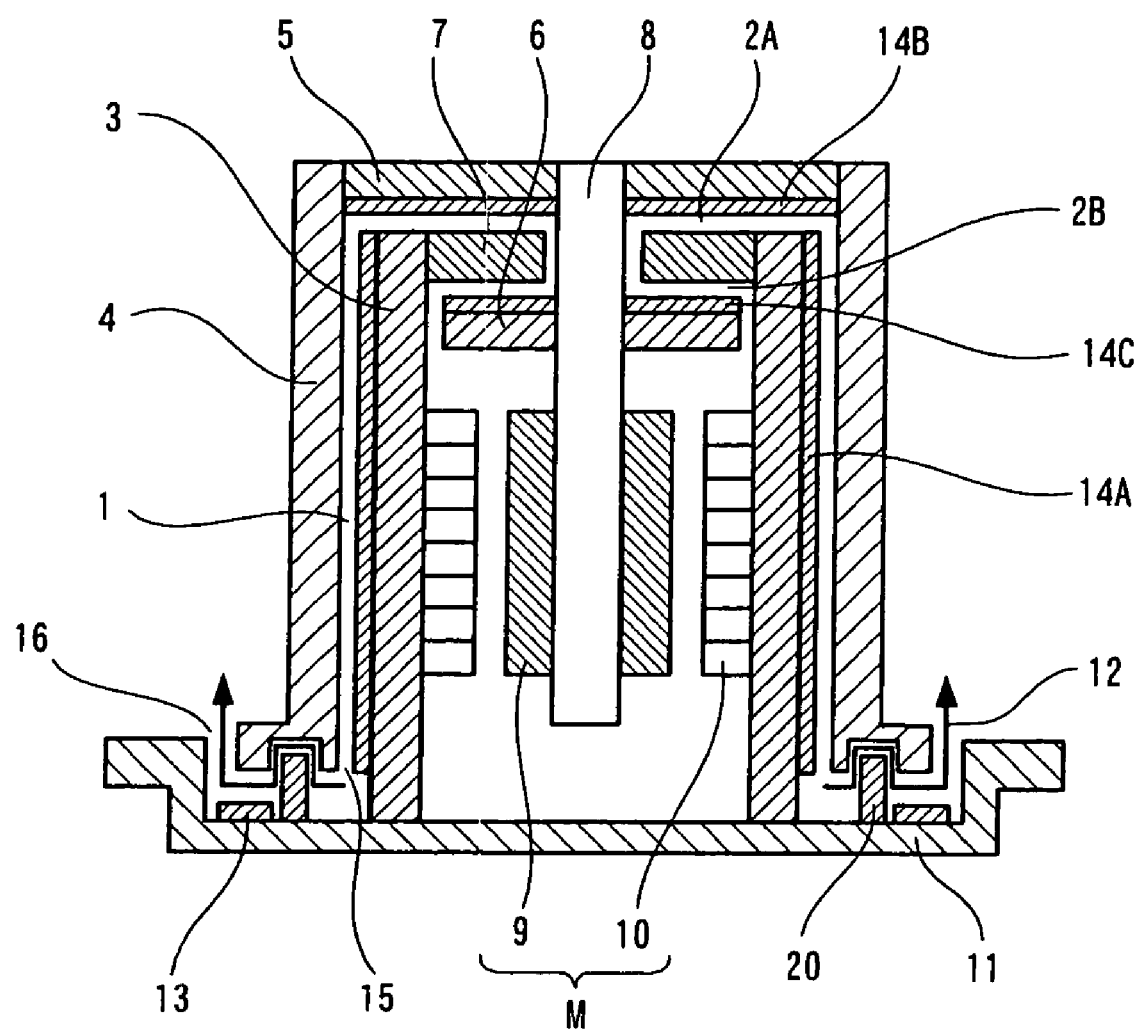
FIG. 4 is a sectional view showing a hydrodynamic bearing motor according to (Embodiment 2) of the present invention.
Figure 5:
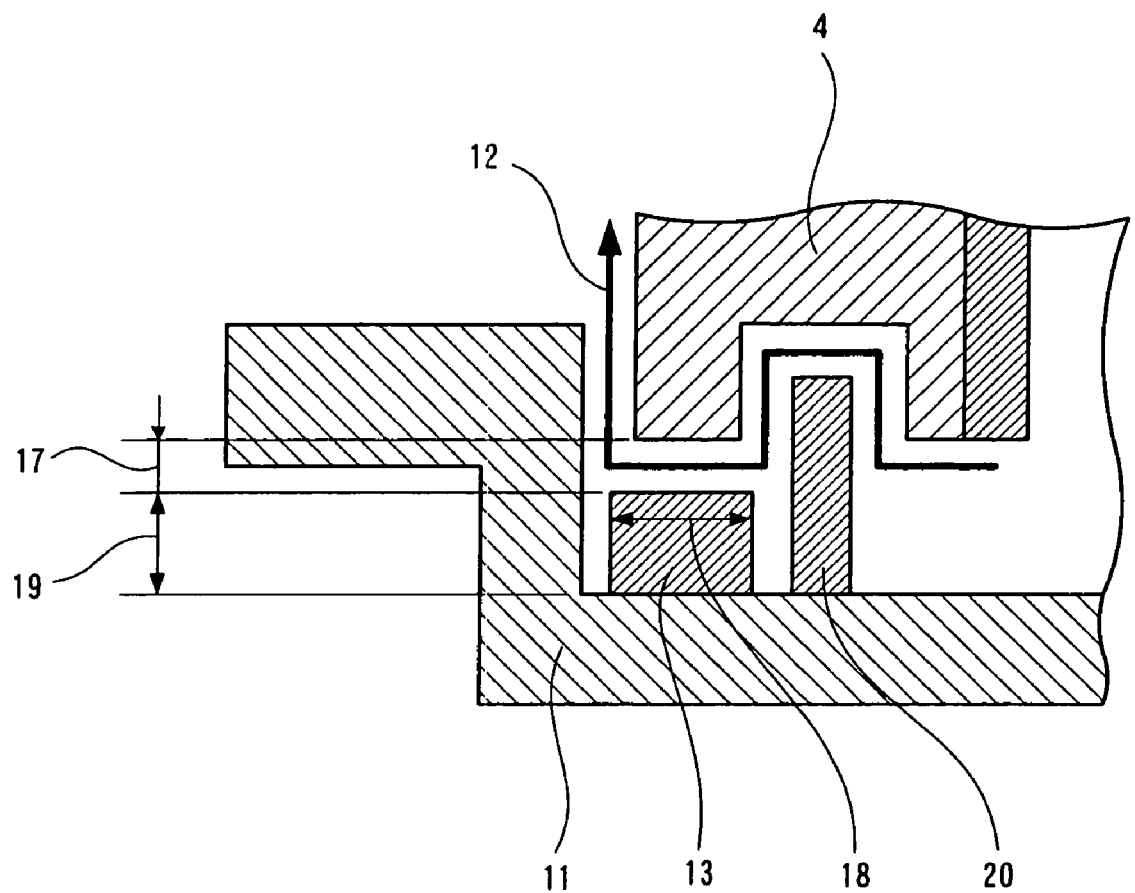
FIG. 5 is an enlarged sectional view showing a connecting passage on the left end according to the embodiment.
Figure 6:
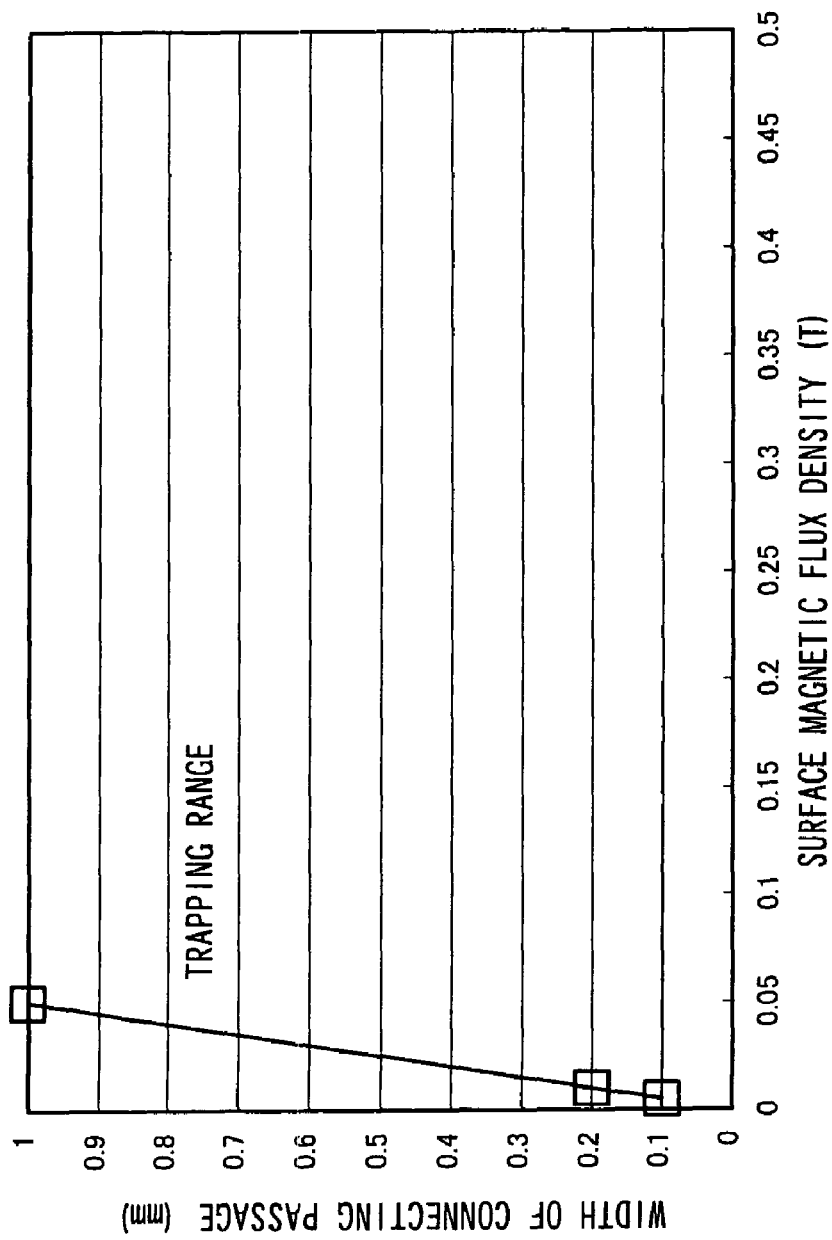
FIG. 6 is a graph showing experiment results on conditions of trapping abraded powder according to the embodiment.

FIGS. 4 to 6 show (Embodiment 2) of the present invention.

In (Embodiment 1), the magnet 13 for trapping abraded powder is provided in the connecting passage 12 between the opening 15 of the sleeve 4 and the external opening 16 of the hydrodynamic bearing motor; whereas in (Embodiment 2) shown in FIG. 4, a labyrinth seal 20 is provided in a connecting passage 12 together with a magnet 13 for trapping abraded powder. Other configurations are similar to those of FIG. 1 and thus the same explanation is omitted.

With this configuration, the known shielding function of the labyrinth seal 20 prevents a flow of abraded powder during the rotation of a hydrodynamic bearing motor. Although the labyrinth seal 20 loses the shielding function during the stop of the hydrodynamic bearing motor, the abraded powder is stuck to the magnet 13 for trapping abraded powder and thus it is possible to prevent the abraded powder from flowing to the outside.

As a result, abraded powder is stuck to the magnet 13 for trapping abraded powder only when the motor is stopped. Thus, it is possible to increase a width 17 of the connecting passage and reduce the surface magnetic flux density of the magnet 13 for trapping abraded powder. Therefore, it is possible to lower the accuracy of working parts to reduce the cost, thereby preventing the magnet 13 for trapping abraded powder from causing a performance degradation of the motor.

The positions of the labyrinth seal 20 and the magnet 13 for trapping abraded powder are not limited to those of FIG. 4 and may be disposed anywhere in the connecting passage 12. To be specific, the labyrinth seal 20 may be disposed on a sleeve 4 and a concave portion may be formed on a base 11.

Further, the labyrinth seal 20 may be formed on two points and shaped like a letter L (not shown). In this way, the position and shape of the labyrinth seal 20 are not limited.

FIG. 5 is a partially enlarged sectional view showing the lower left part of FIG. 4.

In FIG. 5, a width 18 of the magnet 13 for trapping abraded powder, a width 17 of the connecting passage, and a surface magnetic flux density of the magnet 13 for trapping abraded powder are set in such a way that abraded powder passing through the connecting passage is stuck to the magnet 13 for trapping abraded powder.

FIG. 6 is a graph showing trapping conditions for preventing a flow of abraded powder when the width 17 of the connecting passage and the surface magnetic flux density are changed. The width 18 of the magnet for trapping abraded powder is 2.0 mm. The flow can be prevented within a range on the right side of the line of the graph.

As a result of such experiments conducted while changing the width 18 of the magnet for trapping abraded powder, it was found that abraded powder passing through the connecting passage 12 can be stuck to the magnet 13 for trapping abraded powder when the width 18 of the magnet for trapping abraded powder is set at 0.5 mm or larger, the width of the connecting passage is set at 10.0 mm or less, and the surface magnetic flux density of the magnetic 13 for trapping abraded powder is set at 0.01 T or higher. By setting these conditions, it is possible to prevent abraded powder from flowing to the outside of the motor.

EMBODIMENT 3

In (Embodiment 3), a sleeve 4, a thrust main plate 5, and a thrust sub plate 6 are made of an austenitic stainless, and a shaft 3 and a thrust flange 7 are made of a material harder than the austenitic stainless. Other configurations are similar to those of the hydrodynamic bearing motor described in (Embodiment 1). Coating layers 14A, 14B, and 14C are formed on the outer periphery of the shaft 3 and the upper and lower surfaces of the thrust flange 7.

According to the present embodiment, a bearing member which is exposed outside a motor and causes a problem of cleaning is made of an austenitic stainless acting as a non-magnetic material, and the other bearing member is made of a material harder than the austenitic stainless, so that abraded powder is limited to the austenitic stainless. Further, the friction coefficient of a bearing surface can be reduced by changing the hardness of the bearing surface. To be specific, the material can be selected from the group consisting of a martensite stainless, a ferritic stainless, a tool steel, a titanium alloy, and ceramics.

The sleeve 4, the thrust main plate 5, and the thrust sub plate 6 are made of an austenitic stainless and the shaft 3 and the thrust flange 7 are made of a material harder than the austenitic stainless. The shaft 3 and the thrust flange 7 may be made of an austenitic stainless and the sleeve 4, the thrust main plate 5, and the thrust sub plate 6 may be made of a material harder than the austenitic stainless.

In (Embodiment 3), the configuration of (Embodiment 1) was discussed as an example. (Embodiment 3) is similarly applicable to the configuration of (Embodiment 2).

EMBODIMENT 4

Figure 7:
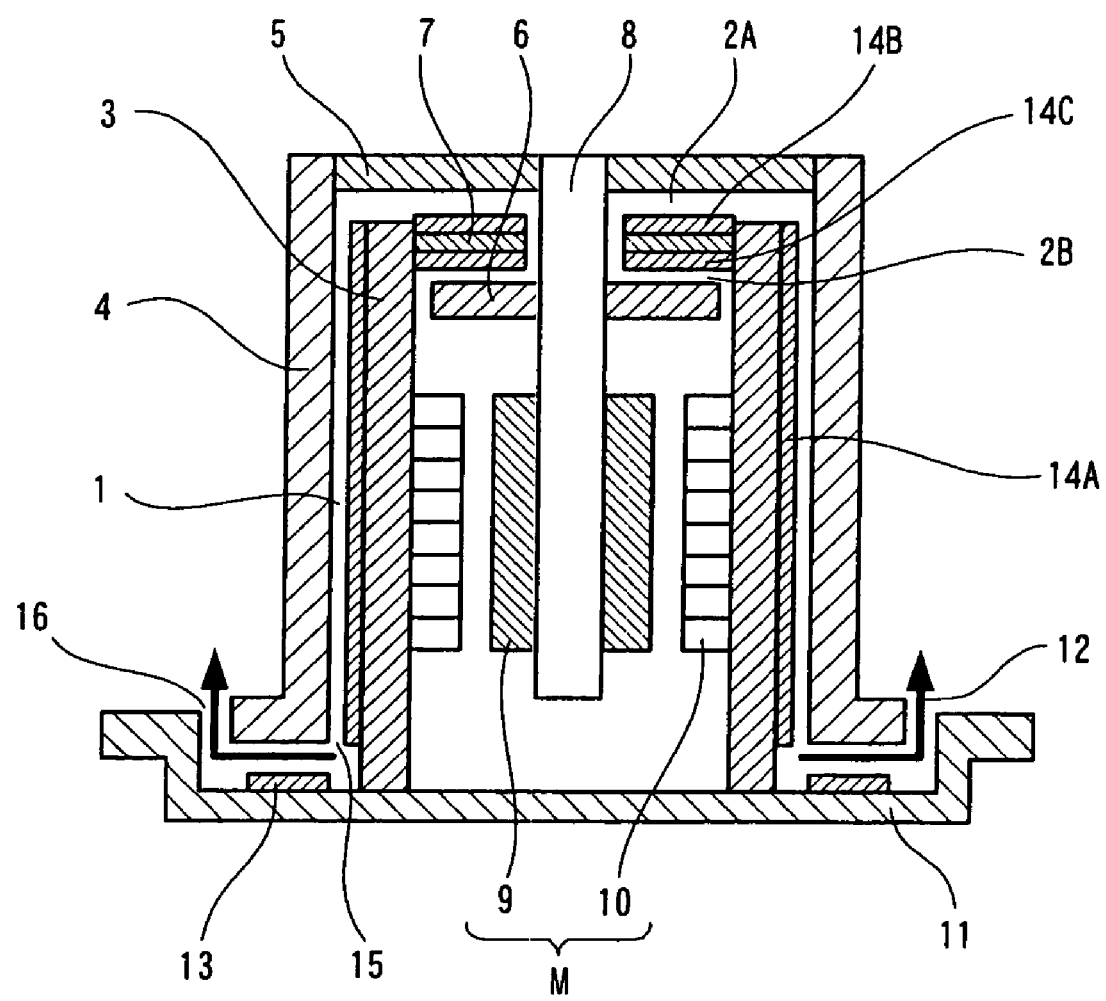
FIG. 7 is a sectional view showing a hydrodynamic bearing motor according to (Embodiment 4) of the present invention.

FIG. 7 shows (Embodiment 4) of the present invention.

In (Embodiment 4), a sleeve 4, a thrust main plate 5, and a thrust sub plate 6 are made of an austenitic stainless and a shaft 3 and a thrust flange 7 are made of a material which is almost equal in thermal expansion coefficient to the austenitic stainless. Other configurations are similar to those of the hydrodynamic bearing motor discussed in (Embodiment 1).

That is, the shaft 3 and the thrust flange 7 are made of a material which is almost equal in thermal expansion coefficient to the austenitic stainless, resulting in a smaller change in the dimensions of a hydrodynamic radial bearing 1 and hydrodynamic thrust bearings 2A and 2B according to a temperature change. Thus, it is possible to reduce fluctuations of bearing performance. To be specific, the material almost equal in thermal expansion coefficient to the austenitic stainless can be selected from the group consisting of copper, a high copper alloy, phosphor bronze, aluminum bronze, and cupronickel.

Moreover, coating layers 14A, 14B, and 14C are formed on the outer periphery of the shaft 3, which is a bearing member not being made of an austenitic stainless, and the upper and lower surfaces of the thrust flange 7. Ceramics such as TiN, TiAlN, TiC, TiCN, CrN, SiC, $Si_3N_4$, $Al_2O_3$, and cBN are suitable for the coating layers. With this configuration, since ceramics have a high hardness, the bearing surface increases in wear resistance.

By using DLC (Diamond Like Carbon) of an amorphous carbon, a hydrogenated amorphous carbon, a diamond like carbon film, a hard carbon film and so on for the coating layers 14A, 14B, and 14C, wear resistance improves and a friction coefficient decreases.

By forming lubricating films of graphite, $MoS_2$, PTFE, and so on as the coating layers 14A, 14B, and 14C, a friction coefficient can be further reduced.

In the foregoing example, when the sleeve 4, the thrust main plate 5, and the thrust sub plate 6 are made of an austenitic stainless and the shaft 3 and the thrust flange 7 are made of a material which is almost equal in thermal expansion coefficient to the austenitic stainless. When the shaft 3 and the thrust flange 7 are made of an austenitic stainless, the sleeve 4, the thrust main plate 5, and the thrust sub plate 6 are made of a material almost equal in thermal expansion coefficient to the austenitic stainless.

Figure 8:
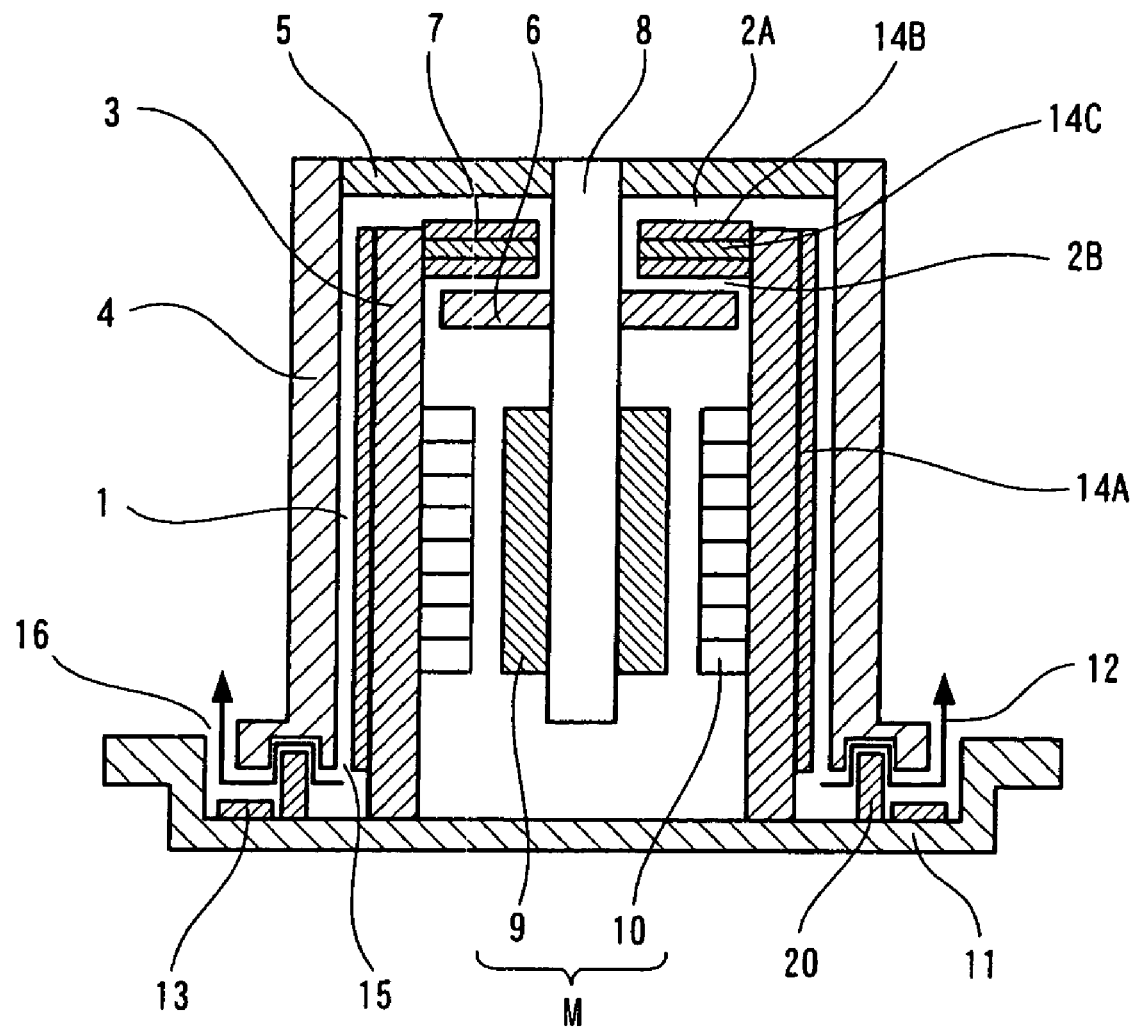
FIG. 8 is a sectional view showing a hydrodynamic bearing motor according to (Embodiment 4) of the present invention.

In (Embodiment 4), the configuration of (Embodiment 1) was discussed as an example. (Embodiment 4) is similarly applicable to the configuration of (Embodiment 2). FIG. 8 shows the configuration of this case.

An austenitic stainless acting as a nonmagnetic substance is used in the above-described manner, thereby increasing a degree of cleaning bearing members. Further, abraded powder of an austenitic stainless is transformed into a magnetic substance. By providing a magnet for trapping abraded powder in a connecting passage between an open end of a bearing and the outside of a motor, it is possible to prevent abraded powder from flowing to the outside.

As described above, according to the hydrodynamic bearing motor of the present invention, the hydrodynamic bearing motor has a shaft which is supported by a hydrodynamic radial bearing and a hydrodynamic thrust bearing so as to rotate in a relative manner, a sleeve, and a driving motor, wherein a magnet for trapping abraded powder is disposed in a connecting passage between an opening of the sleeve and an opening of the hydrodynamic bearing motor, and members forming the hydrodynamic radial bearing and the hydrodynamic thrust bearing are made of an austenitic stainless, or one of members forming the hydrodynamic radial bearing and the hydrodynamic thrust bearing is made of an austenitic stainless and the other member is made of a material harder than the austenitic stainless. Thus, it is possible to achieve a hydrodynamic bearing motor and a device using the same that can prevent abraded powder from flowing to the outside of the hydrodynamic bearing motor, improve a degree of cleaning parts so as to respond to demands on contamination, and keep high reliability. The abraded powder is produced by abrasion at the start and stop of the motor and abrasion caused by disturbance during the rotation of the motor.

The invention claimed is:

1. A hydrodynamic bearing motor, comprising:
   a base;
   a hollow shaft connected to the base;
   a pin located inside said shaft, rotatably supported by the shaft, the pin and shaft comprising a hydrodynamic thrust bearing for supporting said pin,
   a sleeve connected to the pin, the sleeve and shaft comprising a hydrodynamic radial bearing for rotatably supporting the pin via air, and
   a driving motor connected to said pin and said shaft,
   wherein said shaft and said sleeve have a gap therebetween comprising a first passage,
   said sleeve and said base have a gap therebetween comprising a second passage,
   the second passage comprises a magnet for trapping abraded powder,
   components forming the hydrodynamic radial bearing and the hydrodynamic thrust bearing are made of an austenitic stainless, and
   a stress between said components of at least one of the hydrodynamic thrust bearing and the hydrodynamic radial bearing is at least 300 Pa when the hydrodynamic bearing motor is in a stationary state.

2. The hydrodynamic bearing motor according to claim 1, wherein the magnet for trapping abraded powder has a length of at least 0.5 mm along the second passage, the second passage has a width of 2.0 mm or less, and the magnet for trapping abraded powder has a surface magnetic flux density of 0.01 T or higher.

3. The hydrodynamic bearing motor according to claim 2, wherein at least one of facing surfaces forming the hydrodynamic radial bearing and the hydrodynamic thrust bearing has a ceramic coating.

4. The hydrodynamic bearing motor according to claim 2, wherein at least one of facing surfaces forming the hydrodynamic radial bearing and the hydrodynamic thrust bearing is coated with a diamond like carbon.

5. The hydrodynamic bearing motor according to claim 2, wherein of facing surfaces forming the hydrodynamic radial bearing and the hydrodynamic thrust bearing, a lubricating film is formed at least on the facing surface not being made of the austenitic stainless.

6. The hydrodynamic bearing motor according to claim 2, further comprising a lubricating film formed on at least one of facing surfaces forming the hydrodynamic radial bearing and the hydrodynamic thrust bearing.

7. The hydrodynanmic bearing motor according to claim 6, wherein the lubricating film is selected from a group consisting of graphite, $MoS_2$, and PTFE.

8. The hydrodynamic bearing motor according to claim 1, further comprising a labyrinth seal with the magnet for trapping abraded powder in the connecting passage between the opening of the sleeve and the opening of the hydrodynamic bearing motor.

9. The hydrodynamic bearing motor according to claim 8, wherein the magnet for trapping abraded powder has a length of 0.5 mm or longer along the connecting passage, the connecting passage has a width of 10.0 mm or less, and the magnet for trapping abraded powder has a surface magnetic flux density of 0.01 T or higher.

10. The hydrodynamic bearing motor according to claim 8, wherein at least one of facing surfaces forming the hydrodynamic radial bearing and the hydrodynamic thrust bearing has a ceramic coating.

11. The hydrodynamic bearing motor according to claim 8, wherein at least one of facing surfaces forming the hydrodynamic radial bearing and the hydrodynamic thrust bearing is coated with a diamond like carbon.

12. The hydrodynamic bearing motor according to claim 8, further comprising a lubricating film formed on at least one of facing surfaces forming the hydrodynamic radial bearing and the hydrodynamic thrust bearing.

13. The hydrodynamic bearing motor according to claim 8, wherein of facing surfaces forming the hydrodynamic radial bearing and the hydrodynamic thrust bearing, a lubricating film is formed at least on the facing surface not being made of the austenitic stainless.

14. The hydrodynamic bearing motor according to claim 1, wherein at least one of facing surfaces forming the hydrodynamic radial bearing and the hydrodynamic thrust bearing has a ceramic coating.

15. The hydrodynamic bearing motor according to claim 1, wherein at least one of facing surfaces forming the hydrodynamic radial bearing and the hydrodynamic thrust bearing is coated with a diamond like carbon.

16. The hydrodynamic bearing motor according to claim 15, wherein the diamond like carbon is selected from a group consisting of an amorphous carbon, a hydrogenated amorphous carbon, a diamond like carbon film, and a hard carbon film.

17. The hydrodynamic bearing motor according to claim 1, further comprising a lubricating film formed on at least one of the facing surfaces forming the hydrodynamic radial bearing and the hydrodynamic thrust bearing.

18. The hydrodynamic bearing motor according to claim 17, wherein the lubricating film is selected from a group including graphite, $MoS_2$, and PTFE.

19. A rotating device, wherein a rotated member such as polygon mirror and a recording disc is attached to the hydrodynamic bearing motor discussed in claim 1.

20. A hydrodynamic bearing motor, comprising:
a base;
a shaft connected to the base;
a pin rotatably supported by the shaft, the pin and shaft comprising a hydrodynamic thrust bearing,
a sleeve connected to the pin, the sleeve and shaft comprising a hydrodynamic radial bearing for rotatably supporting the pin via air, and
a driving motor connected to the shaft and the pin,
wherein said shaft and said sleeve have a gap therebetween comprising a first passage,
said sleeve and said base have a gap therebetween comprising a second passage,
the second passage comprises a magnet for trapping abraded powder,
one of members forming the hydrodynamic radial bearing and the hydrodynamic thrust bearing is made of an austenitic stainless and the other member is made of a material harder than the austenitic stainless, and
a stress between said one member comprising austenitic stainless and the other member comprising a material harder than austenitic stainless is at least 300 Pa when the hydrodynamic bearing motor is in a stationary state.

21. The hydrodynamic bearing motor according to claim 20, wherein of facing surfaces forming the hydrodynamic radial bearing and the hydrodynamic thrust bearing, at least the facing surface not being made of the austenitic stainless is coated with a ceramic or a diamond like carbon.

22. The hydrodynamic bearing motor according to claim 21, wherein the magnet for trapping abraded powder has a length of at least 0.5 mm along the second passage, the second passage has a width of 2.0 mm or less, and the magnet for trapping abraded powder has a surface magnetic flux density of 0.01 T or higher.

23. The hydrodynamic bearing motor according to claim 21, further comprising a labyrinth seal with the magnet for trapping abraded powder in the connecting passage between the opening of the sleeve and the opening of the hydrodynamic bearing motor.

24. The hydrodynamic bearing motor according to claim 23, wherein the magnet for trapping abraded powder has a length of 0.5 mm or longer along the connecting passage, the connecting passage has a width of 10.0 mm or less, and the magnet for trapping abraded powder has a surface magnetic flux density of 0.01 T or higher.

25. The hydrodynamic bearing motor according to claim 21, wherein at least one of the facing surfaces forming the hydrodynamic radial bearing and the hydrodynamic thrust bearing has a ceramic coating.

26. The hydrodynamic bearing motor according to claim 21, wherein the ceramic of the ceramic coating is selected from a group including TiN, TiAlN, TiC, TiCN, CrN, SiC, $Si_3N_4$, $Al_2O_3$, and cBN.

27. The hydrodynamic bearing motor according to claim 21, wherein at least one of the facing surfaces forming the hydrodynamic radial bearing and the hydrodynamic thrust bearing is coated with a diamond like carbon.

28. The hydrodynamic bearing motor according to claim 20, wherein of facing surfaces forming the hydrodynamic radial bearing and the hydrodynamic thrust bearing, a lubricating film is formed at least on the facing surface not being made of the austenitic stainless.

29. The hydrodynamic bearing motor according to claim 28, wherein the lubricating film is selected from a group including graphite, $MoS_2$, and PTFE.

30. A hydrodynamic bearing motor, comprising:
a base;
a shaft connected to the base;
a pin rotatably supported by the shaft, the pin and shaft comprising a hydrodynamic thrust bearing,
a sleeve connected to the pin, the sleeve and shaft comprising a hydrodynamic radial bearing for rotatably supporting the pin via air, and
a driving motor connected to the pin and the shaft,
wherein said shaft and said sleeve have a gap therebetween comprising a first passage,
said sleeve and said base have a gap therebetween comprising a second passage,
the second passage comprises a magnet for trapping abraded powder,
one of members forming the hydrodynamic radial bearing and the hydrodynamic thrust bearing comprises an austenitic stainless and the other member comprises a material almost equal in thermal expansion coefficient to the austenitic stainless, and
a stress between said one member comprising austenitic stainless and the other member comprising a material almost equal in thermal expansion coefficient to the austenitic stainless is at least 300 Pa when the hydrodynamic bearing motor is in a stationary state.

31. The hydrodynamic bearing motor according to claim 30, wherein the material almost equal in thermal expansion coefficient to the austenitic stainless is selected from a group including copper, a high copper alloy, phosphor bronze, aluminum bronze, and cupronickel.

* * * * *